March 26, 1929.    O. C. REEVES    1,706,965
INDICATING DEVICE
Filed July 16, 1926
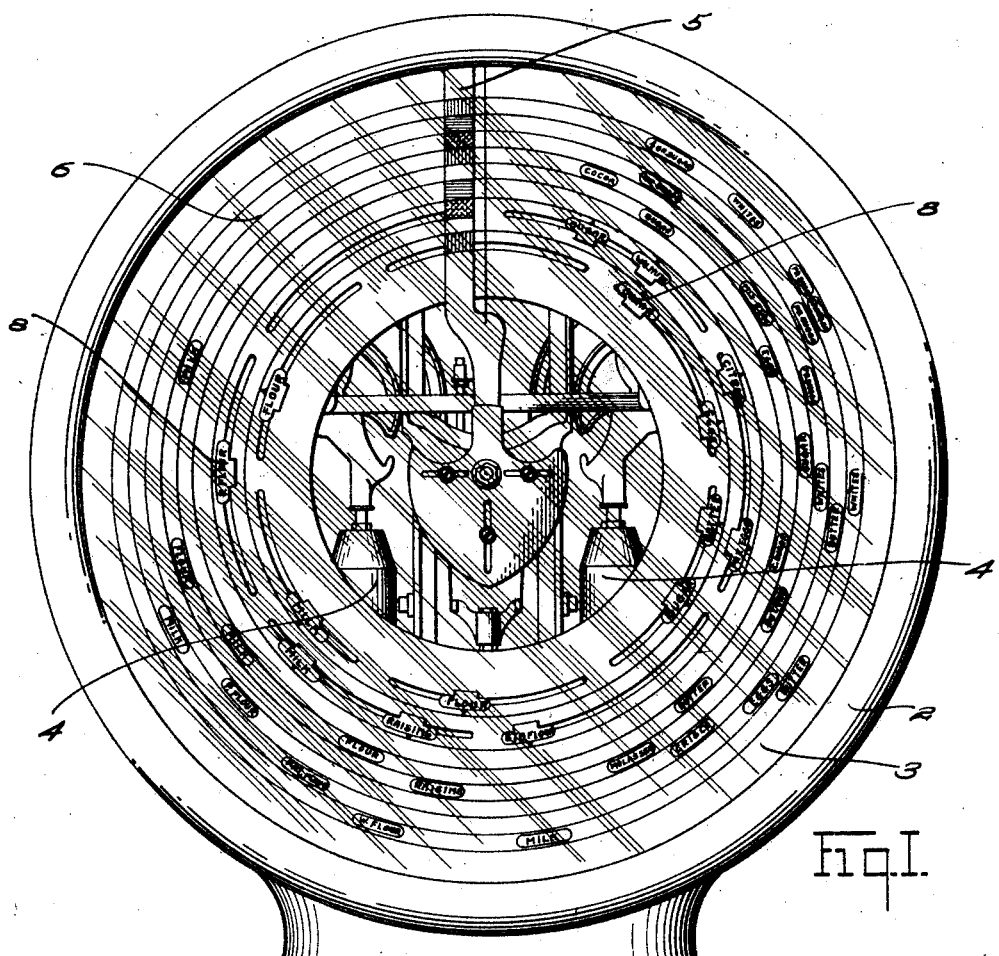
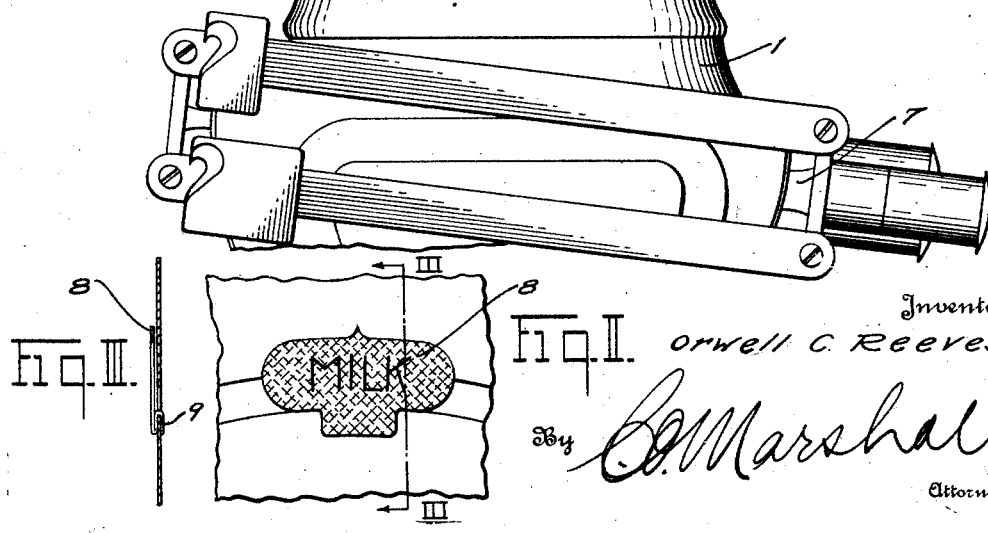

Patented Mar. 26, 1929.

1,706,965

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed July 16, 1926. Serial No. 122,858.

This invention relates to indicating devices, and particularly to indicating devices for use on compounding scales, and one of its principal objects is the provision of means whereby compounds may be mixed by inexperienced operators.

Another object is the provision of means whereby compounds may be mixed by persons ignorant of the actual and relative weights of the several ingredients.

Another object is the provision of a device capable of controlling the amounts of various ingredients for compounds without apprizing the operator or onlookers of the compounding formulæ.

Still another object is the provision of a weighing scale chart having indicia indicating the position to which an indicator should be brought by the addition of each ingredient of the compound.

Still another object is the provision of a chart of this character having provisions for the mixing of several different compounds.

Another object of the invention is the provision of a chart having adjustable and replaceable markers for indicating the positions to which the indicator hand should be brought by the addition of various ingredients of compounds.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of the indicating part of an automatic scale embodying my invention;

Figure II is an enlarged fragmentary view showing a portion of a chart with a removable marker attached thereto; and Figure III is a sectional elevational view taken substantially on the line III—III of Figure II.

The particular use for which I have shown my invention as applicable is the compounding of pastry, cakes and other baking company products. The scale in connection with which my invention is illustrated is of a well known automatic type, and I have shown only so much thereof as will suffice to illustrate the connection of my invention therewith.

The automatic weighing and indicating mechanism of the scale is supported upon an upright column 1, the upper end of which only is shown, and is enclosed within a substantially watch-case-shaped housing 2 having a glazed face 3 through which the automatic counterbalancing mechanism, consisting of a pair of pendulums 4, an indicating hand 5 and the compounding chart 6 are visible. The scale is provided with the usual tare beam lever 7 equipped with beams and poises for counterbalancing containers. Instead of the usual numerals and systematically spaced graduations, the chart of the scale of my invention is provided with concentric rows of predetermined weight marks, each of which is designated by the name of an ingredient of the compound, the space from each designating mark to the succeeding mark being proportional to the weight of an ingredient to be added to the compound. The ingredients named in the illustration are not actual constituents of any particular compound, but are merely severally illustrative. The outer concentric row of marks may be spaced according to the formula of one compound, the next row according to the formula of another compound, etc. In order to avoid confusion in using the compounding scale, the indicator hand is divided into differently colored sections, each of which travels over one of the rows of marks with their designations. The upper section may, as indicated, be colored red, the next blue, the next yellow, etc. In compounding the ingredients for a cake according to one formula the operator pours in the several ingredients until the yellow portion of the hand reaches the respective predetermined weight marks. In compounding according to another formula he may control the addition of the ingredients as indicated by the red portion of the hand.

It will be seen that I have by this means provided a device for accurately gaging the amounts of the several ingredients of various compounds without assigning to the ingredients any specific weight or volume. The machine may be used by an operator to obtain the utmost accuracy of composition without his obtaining the formula.

The portion of the chart above described is intended particularly for use in mixing compounds which are frequently made. For use in mixing special compounds or those infrequently made, I have made a further provision in the form of a portion of the chart equipped with movable and replaceable markers 8. The chart 6 is preferably formed of sheet metal and the markers 8 may also be made of this material, though my invention, of course, is not limited to any particular form or material. In the illustrative embodiment I have shown the movable markers in the form of metal clips mounted on the edges of slots in the chart, the markers being equipped with resilient fingers 9 (see Figure III) which grip the edges of the slots with sufficient force to hold the markers in place. The markers may thus be arranged and shifted to correspond to any desired formula.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a relatively movable chart and index, the chart being marked with a plurality of rows of predetermined weight points designated by symbols representing several ingredients of formulæ, each row of points corresponding to a formula, the points of each row being spaced according to the amounts of the several ingredients of the formula.

2. In a device of the class described, in combination, a relatively movable chart and index, the chart being marked with a plurality of rows of predetermined weight points designated by symbols representing several ingredients of formulæ, each row of points corresponding to a formula, the points of each row being spaced according to the amounts of the several ingredients of the formula, and means dividing the index into sections registering respectively with the rows of predetermined weight points.

3. In a device of the class described, in combination, a relatively movable chart and index, the chart being marked with a plurality of rows of predetermined weight points designated by symbols representing several ingredients of formulæ, each row of points corresponding to a formula, the points of each row being spaced according to the amounts of the several ingredients of the formula, and automatic weighing mechanism connected to said index.

4. In a device of the class described, in combination, a relatively movable chart and index, the chart being marked with a plurality of rows of predetermined weight points designated by symbols representing several ingredients of formulæ, each row of points corresponding to a formula, the points of each row being spaced according to the amounts of the several ingredients of the formula, means dividing the index into sections registering respectively with the rows of predetermined weight points, and automatic weighing mechanism connected to said index.

5. In a device of the class described, in combination, a relatively movable chart and index, and a plurality of rows of movable markers on said chart, each of said markers being designated by a symbol representing an ingredient of a compound.

6. In a device of the class described, in combination, a relatively movable chart and index, said chart having a plurality of rows of concentric arcuate slots and a plurality of removable markers adjustably mounted in each row of said slots, each of said markers being designated by a symbol representing an ingredient of a compound.

7. In a device of the class described, in combination, a relatively movable chart and index, said chart having a plurality of rows of concentric arcuate slots and a plurality of removable markers adjustably mounted in each row of said slots, each of said markers being designated by a symbol representing an ingredient of a compound, said index having a distinctive section registering with the markers of each row of slots.

8. In a device of the class described, in combination, a relatively movable chart and index, said chart having a plurality of rows of concentric arcuate slots and a plurality of removable markers adjustably mounted in each row of said slots, each of said markers being designated by a symbol representing an ingredient of a compound, said index having a distinctive section registering with the markers of each row of slots, and automatic weighing mechanism connected to said index.

ORWELL C. REEVES.